United States Patent Office 3,080,374
Patented Mar. 5, 1963

---

3,080,374
2-GUANIDINO-3-NITROPYRIDINE AND DERIVATIVES THEREOF
John Anthony Carbon, Lake Bluff, Ill., assignor to Abbott Laboratories, North Chicago, Ill., a corporation of Illinois
No Drawing. Filed Feb. 8, 1962, Ser. No. 171,806
6 Claims. (Cl. 260—296)

This invention relates to compounds of the formula

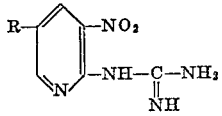

and methods for their preparation. In this and succeeding formulas, R is hydrogen, loweralkyl containing from 1 to 4 carbon atoms or halogen such as chlorine, bromine, fluorine and iodine. These compounds are effective antibacterial agents and are especially active against *Salmonella typhimurium, Escherichia coli, Proteus vulgaris* and *Staphlyococcus aureus* when dispersed in an aqueous medium at a concentration of 50 parts per million.

The new compounds can be readily prepared by refluxing two molecular proportions of guanidine and one molecular proportion of a compound of the formula

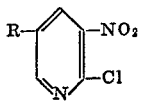

in a solvent such as t-butyl alcohol. By adding concentrated hydrochloric acid to the base thus formed, the corresponding hydrochlorides are obtained which in turn can be neutralized with alkali to obtain the compounds in their free base form. Both the bases and their hydrochlorides can be recrystallized from water.

The following examples illustrate specific embodiments of the invention and are not to be considered as limitations thereof.

EXAMPLE 1
*2-Guanidino-3-Nitropyridine*

A suspension of sodium t-butoxide in t-butyl alcohol was prepared by adding 60.8 g. (1.43 mole) of sodium hydride (56.5% suspension in oil) to 2400 ml. of dry t-butyl alcohol. The mixture was allowed to stand at room temperature until reaction was complete. Thereafter, 150 g. (1.5 mole) of guanidine hydrochloride was added and the mixture warmed on the steam bath with stirring for 30 minutes. The sodium chloride which formed was separated by filtration and the filtrate containing free guanidine was added slowly with stirring to a refluxing solution of 112 g. (0.71 mole) of 2-chloro-3-nitropyridine in 400 ml. of t-butyl alcohol. The addition required 5 hours and the resulting solution was refluxed for another 3 hours. Upon the addition of 125 ml. of concentrated hydrochloric acid, the 2-guanidino-3-nitropyridine hydrochloride which precipitated was filtered off and after recrystallization from water melted at 262°–264° C. with decomposition which analyzed 16.44% chlorine compared to the calculated value of 16.29% chlorine. The free base which melted at 143°–144° C. was obtained in the form of orange needles by neutralization of an aqueous solution of the hydrochloride and recrystallization from water. The base contained 38.55% nitrogen compared to the calculated value of 38.66% nitrogen.

EXAMPLE 2
*2-Guanidino-3-Nitro-5-Methylpyridine*

By substituting 2-chloro-3-nitro-5-methylpyridine for the 2-chloro-3-nitropyridine in the procedure of Example 1, there is obtained 2-guanidino-3-nitro-5-methylpyridine melting at 145°–147° C.

The reaction of guanidine with 2-chloro-3-nitro-5-ethylpyridine, 2-chloro-3-nitro-5-propylpyridine or 2-chloro-3-nitro-5-butylpyridine results in the formation respectively of 2-guanidino-3-nitro-5-ethylpyridine, 2-guanidino-3-nitro-5-propylpyridine and 2-guanidino-3-nitro-5-butylpyridine.

EXAMPLE 3
*2-Guanidino-3-Nitro-5-Chloropyridine*

This compound which melts at 134°–135° C. is obtained by the reaction of guanidine with 2,5-dichloro-3-nitropyridine in the same manner as that described in Example 1.

By reacting guanidine with 2-chloro-3-nitro-5-bromopyridine, 2-chloro-3-nitro-5-fluoropyridine or 2-chloro-3-nitro-5-iodopyridine, there is obtained respectively, 2-guanidino-3-nitro-5-bromopyridine, 2-guanidino-3-nitro-5-fluoropyridine and 2-guanidino-3-nitro-5-iodopyridine.

What I claim is:

1. A compound selected from the group consisting of compounds of the formula

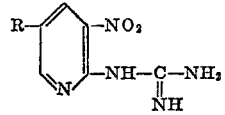

and their hydrochlorides wherein R is a member of the group consisting of hydrogen, loweralkyl, chlorine, bromine, fluorine and iodine.

2. 2-guanidino-3-nitropyridine.
3. 2-guanidino-3-nitro-5-methylpyridine.
4. 2-guanidino-3-nitro-5-chloropyridine.
5. A method for the preparation of a compound of the formula

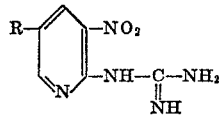

wherein R is a member of the group consisting of hydrogen, loweralkyl, chlorine, bromine, fluorine and iodine which comprises refluxing guanidine and a compound of the formula

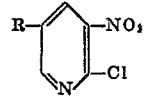

in t-butyl alcohol wherein R is as defined above and recovering the product thus formed from the reaction mixture.

6. A method as claimed in claim 5 wherein two molecular proportions of guanidine are reacted with one molecular proportion of a compound of the formula

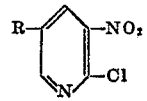

wherein R is a member of the group consisting of hydrogen loweralkyl, chlorine, bromine, fluorine and iodine.

No references cited.